United States Patent
Wong et al.

(10) Patent No.: US 6,851,710 B2
(45) Date of Patent: Feb. 8, 2005

(54) APPARATUS AND METHOD FOR RAPID AIRBAG COMPONENT INSTALLATION

(75) Inventors: Hung Sung Wong, Troy, MI (US); Rachel Thomas, Clarkston, MI (US)

(73) Assignee: Autoliv ASP, Inc., Ogden, UT (US)

(*) Notice: Subject to any disclaimer, the term of this patent is extended or adjusted under 35 U.S.C. 154(b) by 76 days.

(21) Appl. No.: 09/799,763

(22) Filed: Mar. 6, 2001

(65) Prior Publication Data

US 2002/0125705 A1 Sep. 12, 2002

(51) Int. Cl.$^7$ .............................................. B60R 21/16
(52) U.S. Cl. .................................................. 280/743.2
(58) Field of Search ........................ 280/730.2, 728.2, 280/743.2, 752; 411/508, 509, 510

(56) References Cited

U.S. PATENT DOCUMENTS

| | | | |
|---|---|---|---|
| 3,114,184 A | | 12/1963 | Bigaouette |
| 3,304,106 A | * | 2/1967 | McCormack ................ 403/306 |
| 3,494,244 A | * | 2/1970 | Wayland ...................... 411/510 |
| 3,727,271 A | * | 4/1973 | Znamirowski .............. 411/508 |
| D273,091 S | * | 3/1984 | Kurosaki ...................... D8/499 |
| 4,477,950 A | | 10/1984 | Cisek et al. |
| 4,728,238 A | * | 3/1988 | Chisholm et al. ........... 411/456 |
| 5,324,074 A | | 6/1994 | Christian et al. |
| 5,396,684 A | | 3/1995 | Yocom |
| 5,398,960 A | | 3/1995 | Ravenberg et al. |
| 5,474,324 A | | 12/1995 | Bentley et al. |
| 5,480,181 A | * | 1/1996 | Bark et al. ................... 280/729 |
| 5,601,261 A | | 2/1997 | Koike |
| 5,647,607 A | | 7/1997 | Bolieau |
| 5,672,038 A | * | 9/1997 | Eaton ........................... 411/508 |
| 5,716,161 A | * | 2/1998 | Moore et al. ................ 403/326 |
| 5,745,958 A | | 5/1998 | Kaldor |
| 5,788,270 A | | 8/1998 | Haland et al. |
| 5,791,683 A | * | 8/1998 | Shibata et al. ............ 280/730.1 |
| 5,797,714 A | * | 8/1998 | Oddenino ................... 411/508 |
| 5,878,520 A | | 3/1999 | Milbrandt et al. |
| 5,884,937 A | | 3/1999 | Yamada |
| 5,899,489 A | | 5/1999 | Jost |
| 5,921,575 A | | 7/1999 | Kretschmer et al. |
| 5,924,722 A | * | 7/1999 | Koide et al. .............. 280/730.2 |
| 5,924,831 A | | 7/1999 | Ricks et al. |
| 5,931,492 A | | 8/1999 | Mueller et al. |
| 5,934,729 A | * | 8/1999 | Baack ....................... 296/146.7 |
| 5,947,509 A | | 9/1999 | Ricks et al. |
| 5,957,487 A | * | 9/1999 | Stutz ........................ 280/730.2 |
| 6,022,044 A | * | 2/2000 | Cherry ..................... 280/728.2 |
| 6,062,622 A | | 5/2000 | Susman et al. |
| 6,073,961 A | | 6/2000 | Bailey et al. |
| 6,079,732 A | * | 6/2000 | Nakajima et al. ........ 280/728.1 |
| 6,095,551 A | * | 8/2000 | O'Docherty .............. 280/730.2 |
| 6,129,377 A | * | 10/2000 | Okumura et al. ........ 280/730.2 |
| 6,135,490 A | | 10/2000 | Spary |
| 6,135,497 A | | 10/2000 | Sutherland et al. |

(List continued on next page.)

Primary Examiner—Paul N. Dickson
Assistant Examiner—Faye M. Fleming
(74) Attorney, Agent, or Firm—Sally J. Brown (57) ABSTRACT

Attachment assemblies are provided for attaching airbag components, such as inflatable curtain modules and tethers, to surfaces inside a vehicle. The attachment assemblies may include a clip with a tapered stud having a circular or rectangular cross-sectional shape that can be pressed into a corresponding opening of the vehicle surface. Each of the tapered studs may have a plurality of branches designed to reduce the force required to insert the tapered stud into the corresponding opening. Additionally, each clip may have a flange with a contoured shape designed to fit closely to its associated vehicle surface and to position the airbag component properly for deployment. A tether may be routed, or removably attached to ensure positioning for proper deployment, through the use of one or more attachment assemblies that permit breakaway of the tether from each attachment assembly. Curtain modules may be more permanently affixed to the attachment assemblies.

25 Claims, 6 Drawing Sheets

U.S. PATENT DOCUMENTS

| | | | |
|---|---|---|---|
| 6,145,870 A * | 11/2000 | Devane et al. ............ 280/728.2 |
| 6,149,185 A * | 11/2000 | White et al. ............. 280/728.2 |
| 6,152,485 A * | 11/2000 | Kato ....................... 280/728.2 |
| 6,168,186 B1 | 1/2001 | Welch et al. |
| 6,176,513 B1 * | 1/2001 | Neidert ...................... 280/729 |
| 6,192,554 B1 | 2/2001 | Dumcum |
| 6,217,061 B1 | 4/2001 | Harland et al. |
| 6,224,091 B1 * | 5/2001 | Eyrainer et al. ......... 280/730.2 |
| 6,237,938 B1 * | 5/2001 | Boxey .................... 280/730.2 |
| 6,237,939 B1 * | 5/2001 | Resh ....................... 280/730.2 |
| 6,237,943 B1 * | 5/2001 | Brown et al. ............ 280/730.2 |
| 6,260,878 B1 | 7/2001 | Tanase |
| 6,290,253 B1 * | 9/2001 | Tietze et al. ............. 280/730.2 |
| 6,328,333 B1 | 12/2001 | Patel et al. |
| 6,361,068 B1 * | 3/2002 | Stein et al. ............... 280/730.2 |
| 6,375,214 B1 * | 4/2002 | Nishikaji ................. 280/728.2 |
| 6,378,897 B1 * | 4/2002 | Butters et al. ........... 280/728.2 |
| 6,412,810 B1 * | 7/2002 | Wipasuramonton et al. ....................... 280/728.2 |
| 6,431,585 B1 | 8/2002 | Rickabus et al. |
| 6,454,296 B1 | 9/2002 | Tesch et al. |
| 6,502,858 B2 | 1/2003 | Amamori |
| 6,658,703 B1 | 12/2003 | Teango et al. |
| 2003/0178832 A1 | 9/2003 | Dominissini et al. |

\* cited by examiner

APPARATUS AND METHOD FOR RAPID AIRBAG COMPONENT INSTALLATION

BACKGROUND OF THE INVENTION

1. The Field of the Invention

The present invention relates to the manufacture and installation of airbag components. More specifically, the present invention relates to a novel method and system for attaching an inflatable cushion or tether for an airbag to an interior surface of a vehicle.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield. Side impact airbags have also been developed in response to the need for similar protection from impacts in a lateral direction, or against the side of the vehicle.

However, despite their enormous lifesaving potential, airbags have typically been limited to certain vehicles and configurations. In part, these limitations are a result of the limited methods that have been available for fastening an airbag component to an interior surface of the vehicle. One such airbag component is an inflatable cushion member. Such a cushion member may be folded or rolled and attached to a roof rail (the frame extension extending along the sides of the roof, at the junction of the side windows and roof ) of a vehicle.

The cushion member may be designed to unfold or unroll downward to inflate beside a passenger to keep the passenger from hitting the door or window during lateral impact. According to known methods, the cushion member may be attached to the roof rail by forming a hole in the fabric near the seam of the cushion member and aligning the hole with another hole formed in the roof rail. A fastener, such as a bolt, may then be threaded through both holes to mount the cushion member in place. This and other known fastening methods have a number of inherent disadvantages.

One disadvantage of known systems for attaching a cushion member to a vehicle surface is that the equipment used to attach the cushion member is somewhat bulky. Many parts of a vehicle interior have little room to accommodate the cushion material. The added bulk of fasteners such as bolts, screws, rivets, and the like often exceeds the available space at a location, so that the cushion member must be positioned at a less desirable location. The head of the fastener keeps the cushion member from folding evenly and compactly in its compartment. This is especially problematic in the case of side impact airbags, in which folding space is tightly constrained. Some more compact vehicles simply do not have the space to accommodate the bulk of certain airbags, such as side impact airbags.

Additionally, many known fastening systems are somewhat heavy, and therefore add significantly to the weight of the vehicle. In a time when automakers are cutting weight wherever possible in order to improve fuel efficiency and handling, even the extra weight produced by an airbag fastening system can be significant. Heavier fastening systems are also more expensive to ship to the automobile manufacturer for installation.

Yet further, previously-known airbag attachment systems can be difficult to install. Often, several steps are required. For example, the cushion member may need to be aligned and held in position over the vehicle surface. Then, fasteners such as screws or bolts may need to be threaded through the proper holes and tightened. The tightening process may require that an operator use considerable care to tighten each fastener to the appropriate load. The entire process may require that multiple installers take several minutes, working together, to install each unit.

Some known fasteners require access to a rear portion of a vehicle surface in order to effect attachment. For example, bolt/nut combinations and the like may require that the cushion member be attached to the vehicle surface prior to assembly of the vehicle so that installation personnel can access both sides of the vehicle surface to complete the attachment. The result is that assembly of the vehicle may need to be delayed to accommodate installation of the cushion member.

Many known attachment schemes also require that an operator install the cushion member from inside the vehicle. Installation personnel must therefore either get into each vehicle or bend over into an awkward position to install the airbag assembly. The result is that the installation task is unpleasant, time-consuming, and potentially injurious if carried out repetitively.

Additionally, many airbag attachment methods require extensive use of tools to install the airbag components. Even the use of comparatively common and simple tools such as screwdrivers and wrenches, adds significantly to the installation time because the cushion member must be positioned, held in place, and then attached using the tool. Two or more installers maybe needed because the process of holding the component in place and applying the necessary tool can require more than two hands. Installation is further complicated if the tool must be applied from an awkward position, such as inside the vehicle.

Known fastening methods also tend to add to the cost of airbag manufacturing and installation. If damage is discovered anywhere in the cushion member, it is likely that the entire assembly will have to be scrapped. The stringent specifications for airbag manufacturing may require that fasteners not be reconnected because an unacceptable level of damage to the airbag fabric may result.

Additionally, some existing attachment systems have surfaces that rub undesirably against each other during operation of the vehicle so that squeaks, rattling, or other disconcerting sounds are produced. Such sounds may, for a common consumer, be interpreted as indicia of poor vehicle quality even though the cushion member has been properly installed.

Other attachment systems are not easily removable. After deployment of an airbag, it may be desirable to replace the cushion member just in case the cushion member has become weakened or otherwise unusable as a result of deployment. However, some fasteners make the replacement process unnecessarily difficult and expensive because they are not accessible or cannot be removed without spending considerable time and using special tooling.

Perhaps the most severe deficiency of known fastening methods is the heightened danger of airbag malfunction due to installation errors, material defects, or design errors. In the case of threaded fasteners, tightening the fasteners to the proper load is often a critical step because too much tightening can damage the cushion member, the fastener, or the vehicle surface, thereby raising the possibility of an airbag malfunction. It is easy for a tight-fitting fastener to abrade or even begin to sever the fabric material during and after assembly. With threaded fasteners, the fabric of the airbag around the hole is compressed, undesirably twisted, and possibly damaged when the bolt is screwed into place. This increases the chances that the airbag will fail to deploy properly. If the fastener is not sufficiently loaded, the cushion may come loose during the explosive force of inflation and deploy at a location where it can fail to protect a passenger or even cause injury.

Even if the problems described above occur only in one installed airbag out of every several thousand, the one faulty airbag may be the cause of serious injury. As a result, it is critical that more reliable and error-free fastening systems and methods be discovered.

In addition to the problems described above, known methods of attaching a tether for the cushion member are subject to a number of problems. Tethers may be used to ensure that the inflated cushion member remains properly positioned to protect vehicle occupants. For example, a tether may be affixed to what will be the bottom end of the cushion member upon inflation and anchored to a plate pivotally affixed to the A pillar (the strut extending between the windshield and driver's or passenger's side window) with a bolt or screw. Tethers may also be attached to the B pillar (the strut between the front and rear windows) in similar fashion.

Such known methods of attaching the tether may share some of the problems described above in connection with cushion member attachment. However, known tether attachment methods also have a unique problem due to the operation of the tether and the geometry of the A pillar trim.

Typically, the tether is anchored toward the bottom of the A pillar and laid against the A pillar to reach the uninflated cushion member. Trim is then mounted on the A pillar so that the tether is hidden from passengers. In operation, when the cushion member deploys, the tether should slide out of the trim with little resistance to hold the cushion member in place.

However, during installation, the tether necessarily has some slack and can therefore move against the A pillar. Thus, the tether must be held in position while the trim is attached. Otherwise, the tether may stick out from the trim where a user can see it. Even worse, there is some chance that the tether will be positioned behind the attachment of the trim so that the tether is unable to slip out of the trim when the cushion member inflates. If the tether is unable to slide free of the trim, there is a high probability that the cushion member will not inflate properly. Indeed, the cushion member may even inflate at a dangerous angle and cause injury to passengers. However, since the trim is typically designed to enclose the tether, it is difficult to hold the tether in the proper position while installing the trim.

Accordingly, a need exists for a novel apparatus and method of attaching an airbag component, such as a cushion member or tether, to a vehicle surface. Such an apparatus and method should be compact and lightweight so that the airbag component may be installed in a comparatively narrow volume, such as a space beside the roof rail or the A pillar, without adding significant weight to the vehicle. The apparatus and method should also be quick and easy to install so that installation costs are reduced and the possibility of installation error is minimized. Indeed, installation is preferably possible from outside the vehicle with a minimum of tooling.

The method and apparatus also preferably should not require access to any rear portion of an attachment surface.

Still further, such a method and apparatus should preferably be easily accessed and removed so that damaged or used cushion members may be conveniently removed and replaced. Preferably, the apparatus is conducive to inexpensive manufacturing and installation.

When the airbag component to be attached is a cushion member, the apparatus and method should preferably operate without significantly damaging the airbag fabric so that the reliability of the airbag system is maintained and a minimum of labor material is wasted on scrapped parts. In the case of a tether, the apparatus and method preferably secures the tether such that the tether is properly positioned when the trim is installed. Additionally, the apparatus and method preferably permits fixation of the tether only at the correct position so that the tether cannot be installed improperly.

BRIEF SUMMARY OF THE INVENTION

The apparatus of the present invention has been developed in response to the present state of the art, and in particular, in response to the problems and needs in the art that have not yet been fully solved by currently available airbag component attachment systems and methods. Thus, it is an overall objective of the present invention to provide an apparatus and method for securely fastening an airbag component, such as a cushion member or tether, to a vehicle interior, with a higher degree of economy, time efficiency, safety, and overall effectiveness than was possible with prior art systems.

To achieve the foregoing objective, and in accordance with the invention as embodied and broadly described herein, novel attachment assemblies are provided. The attachment assembly may be adapted for use with a curtain module containing a cushion member or a tether designed to restrain the cushion member. The attachment assembly may be used with any properly positioned vehicle surface; the roof rail, the A pillar, and the B pillar will be referred to as exemplary vehicle surfaces. According to certain exemplary configurations, several attachment assemblies may be used to attach the curtain module to the roof rail. One or more attachment assemblies may similarly be used to removably attach an intermediate portion of the tether to the A pillar so that the tether is held at the correct position when the trim is attached. Each attachment assembly may include a clip designed to hold the airbag component against the vehicle surface.

Each clip may, in turn, have a protrusion configured to fit into an opening formed in the vehicle surface. Preferably, the protrusion is configured as a tapered stud with an uncompressed configuration too large to fit through the opening and a compressed configuration in which the tapered stud can be inserted into the opening. More specifically, the tapered stud may have a plurality of flexible branches that can bend when the tapered stud is inserted into the opening. After the tapered stud has passed into the opening, the branches return to their undeflected condition and do not easily bend in the reverse direction. As a result, the tapered stud is held firmly within the opening.

In certain configurations, particularly those in which a curtain module is the airbag component to be attached, the clip also has a head connected to the tapered stud by a shank narrow enough to fit within the opening with clearance. The curtain module may have an envelope or other member in which a hole is formed in alignment with the opening of the vehicle surface. Preferably, the hole is smaller than the head. Thus, the head may be positioned within the envelope with the shank extending through the hole. In this manner the clip can be seated in the curtain module so that when the tapered stud is inserted into the opening, the curtain module is held firmly against the vehicle surface.

If desired, a washer may be fitted around the shank after the head is seated in the curtain module, but prior to insertion of the tapered stud into the opening of the vehicle surface. The washer may be shaped to grip the shank so that the shank is unable to slip through the hole of the curtain module. Thus, the clip may be effectively attached to the curtain module so that the module and clip can be shipped to an automaker fully assembled and ready for attachment to the vehicle surface.

The curtain module may also be attached to the roof rail with an additional form of attachment such as a bolt or other rigid mechanical fastener. A flap may be formed in the curtain module and may extend parallel to the vehicle surface. The rigid mechanical fastener may then be inserted through a hole in the flap and engaged within another opening of the vehicle surface. Such an additional fastener may provide additional stability and support for the clip. The rigid mechanical fastener may be attached at a more accessible location so that the proper tooling can easily be used to attach the rigid mechanical fastener. The clip requires no tooling and therefore can be installed at locations, such as inward-facing surfaces of the roof rail, that would be inconvenient for fasteners that must be attached with tools.

In place of the head, the clip may have a flange connected to the tapered stud through the shank. Such a clip may be used for attachment of a curtain module or a tether. The flange may have a wide variety of configurations adapted to the geometry of the vehicle surface and the desired location of the airbag component to be attached. For example, the flange may simply take the form of a flat piece of material integrally formed with the shank and the tapered stud. More specifically, the flange may have a first side attached perpendicular to the stud and a second side facing away from the first side and the tapered stud. The second side may have a mounting surface on which the airbag component can be attached.

In the case of a curtain module, the attachment of the curtain module to the mounting surface is preferably permanent or semi-permanent. Thus, an envelope or other part of the curtain module may be affixed to the mounting surface through the use of several staples, sewn threads, adhesives, or the like. In the case of a tether, attachment of the tether to the mounting surface is preferably weak enough that the tether can break free of the vehicle surface when the cushion member inflates. Thus, a weaker attachment, such as a single staple or piece of thread, may be used to attach the tether to the mounting surface.

The flange need not be a straight, flat shape, but may comprise multiple flat portions joined at an angle, such as an L-shape, or a curved shape. Such shapes may be used to displace the airbag component from the opening in the vehicle surface. For example, the tapered stud and the shank may be affixed to an angled extension of an L-shaped flange and the mounting surface may be located on a portion of the flange turned ninety degrees from the angled extension. Thus, the tapered stud may be inserted into an opening on the top side of the vehicle surface while still positioning the airbag component on the inside of the vehicle surface. In this manner, an installer may effectively install an airbag component on a vehicle surface disposed on the interior of the vehicle without having to insert the tapered stud into the opening from inside the vehicle. A flange with a generally curved shape may be used to obtain the same effect.

Through the use of the mounting assemblies provided by the present invention, installation of airbag components may be carried out comparatively rapidly. Additionally, selected configurations do not require the use of any tooling for installation. Those configurations that require tooling generally do so only in locations easily accessible to installation personnel. Installers need not enter the vehicle or move into an awkward position to install the airbag components.

Additionally, the mounting assemblies provided by the invention are simple, inexpensive, compact, lightweight, and reliable. If desired, the clips may be configured to be removable upon the application of sufficient force in excess of that encountered in normal operation of the vehicle or in deployment of the airbag.

For those configurations in which the airbag component is a tether, the present invention provides a method by which the tether can be easily and consistently routed. Thus, the tether is properly positioned when the trim is installed so that the tether remains hidden from view, yet deploys without being impeded by the trim.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

The present invention utilizes a number of physical principles to enhance the speed, reliability, and comfort of airbag installation. For example, the attachment assemblies of the present invention are designed to control the direction from which installation occurs and the forces required to attach or detatch airbag components.

As mentioned above, one drawback of previously-known attachment assemblies is that the assemblies had to be installed from awkward angles, such as from inside the vehicle. It is well-known that certain tasks are more easily performed from one angle than from another. A person can perform a manual task much more rapidly, and with a much lower incidence of injury or discomfort, if the task is arranged such that the person's arms and hands can move without a large amount of bending and twisting.

Known airbag attachment assemblies typically required that the airbag component be installed by holding it directly against the mounting surface and then fastening the airbag component to the mounting surface. Fastening the component often involved the application of bolts, screws, or the like, into holes outside the installer's convenient field of vision. Thus, installation personnel would typically have to reach around inside the vehicle or enter the vehicle, to attach the airbag component.

The present invention provides novel attachment assemblies that are better adapted to the natural capabilities of installation personnel. According to certain embodiments, parts that must be affixed from within the vehicle are generally attachable through the application of simple, direct pressure, rather than the more difficult and unwieldy twisting or bending motions that are often required for the installation of rigid mechanical fasteners. Rigid mechanical fasteners may still be used, but are preferably positioned so that their more complicated attachment procedures can be carried out from a convenient angle.

For actions that must be carried out from less convenient angles, the attachment assemblies provided by the invention are designed such that the attachment force is small enough that an installer can accomplish the installation with relative ease, despite the awkward angle from which the force must be applied. In addition to the attachment force, the fastening strength, or force required to detachment the attachment assembly, may also be carefully controlled by the present invention.

The cushion attachment may be designed such that the fastening strength is great enough to hold the curtain module in place during operation of the vehicle and deployment of the airbag, but not so great that the curtain module cannot be deliberately removed for replacement or servicing. Thus, it may be desirable to have a cushion attachment for which the attachment force is somewhat less than the fastening strength.

In the case of the tether attachment, the fastening strength is even more carefully controlled. Preferably, the tether attachment is designed to permit detachment upon deployment of the airbag assembly. A deliberate failure point is provided in the attachment assembly so that the tether can tear away from the clip when the airbag deploys.

Thus, by controlling the attachment force and installation strength as well as the angle from which forces must be applied, the attachment assemblies of the present invention make installation of airbag components faster and easier. Examples of methods and apparatus embodying these principles will be shown and described in greater detail in the following description.

Figure 1:
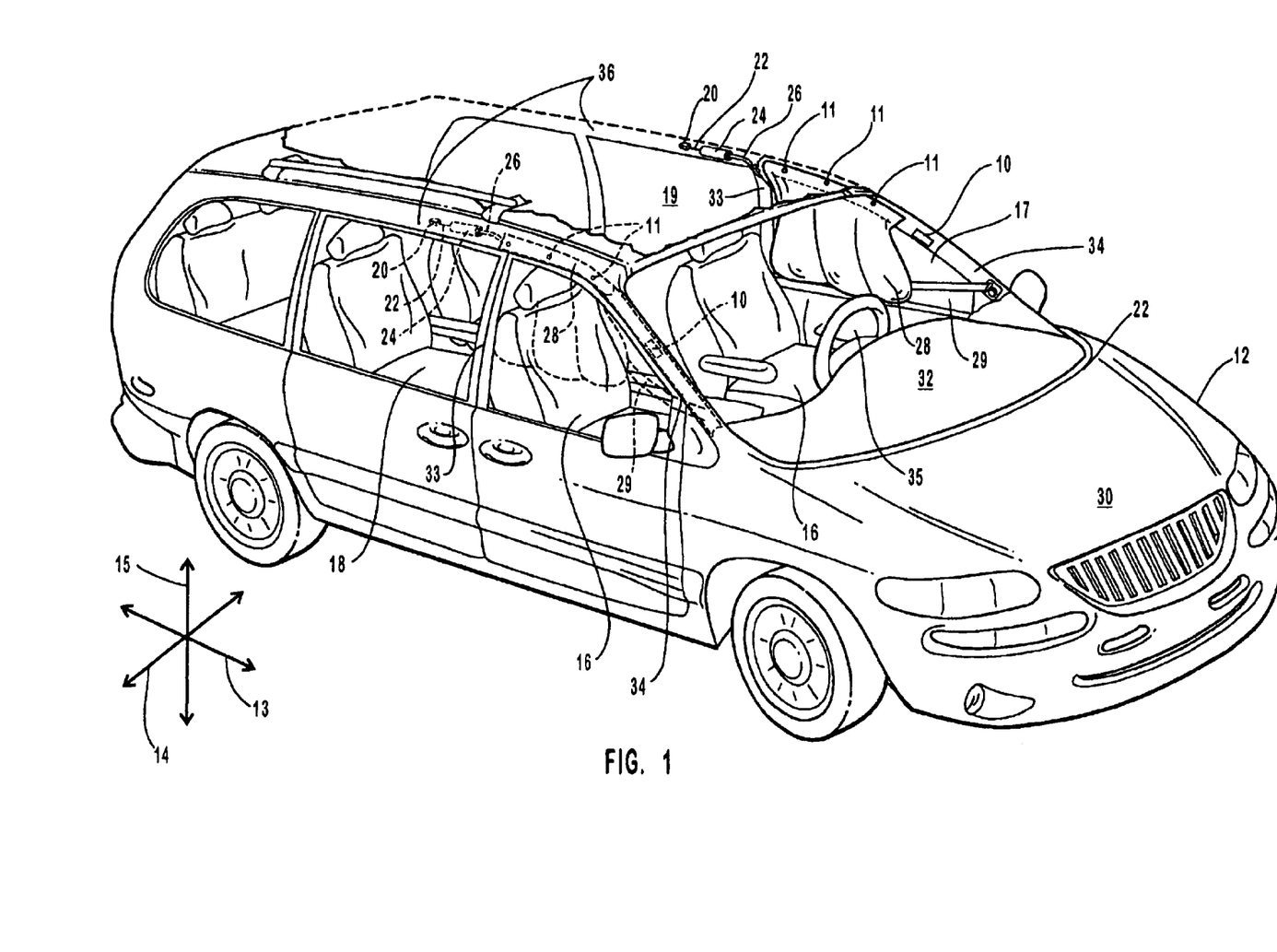
FIG. 1 is a perspective view of a vehicle incorporating attachment assemblies, including tether attachments and cushion attachments according to the invention, with cushion members and tethers in a deployed configuration.

Referring to FIG. 1, attachment assemblies, including a tether attachment 10 and cushion attachments 11, are shown installed in a vehicle 12. The vehicle 12 has a longitudinal direction 13, a lateral direction 14, and a transverse direction 15. The vehicle 12 further has front seats 16 laterally displaced from a first lateral surface 17, or front door 17, as shown in the vehicle 12 of FIG. 1. The vehicle 12 also has rear seats 18 laterally displaced from a second lateral surface 19, or rear door 19, as depicted.

One or more accelerometers 20 or other similar impact sensing devices detect sudden lateral acceleration (or deceleration) of the vehicle 12 and transmit electric signals via electric lines 22 to sources 24 of pressurized gas, or inflators 24. Each of the inflators 24 may take the form of a hollow pressure vessel containing a chemically reactive material that initiates a rapid pressure surge in the inflator 24 upon application of electricity. The expanding gases travel through supply tubes 26 to inflate cushion members 28 situated between a occupants of the front seats 16 and the front doors 17. The entire process occurs with such rapidity that, before the vehicle 12 has fully reacted to the impact, the cushion members 28 have inflated to protect vehicle passengers.

Tethers 29 may be attached to the cushion members 28 to keep the cushion members 28 positioned against the front doors 17 so that they do not injure users when they inflate or move to a less protective position. Each of the tethers 29 may be substantially constructed of a sturdy fabric material. The accelerometers 20 and inflators 24 may be stowed within an engine compartment 30 or dashboard 32, or may be arrayed closer to the cushion members 28, as depicted in FIG. 1. The inflated cushion members 28 may or may not extend far enough to cover B pillars 33 of the vehicle 12, which extend generally vertically between the front and rear doors 17, 19. Each of the tethers 29 may be anchored to one of the A pillars 34, which are positioned between the front doors 17 and the windshield 35.

As depicted in FIG. 1, each of the cushion members 28 is installed along a roof rail 36 over the front door 17. More particularly, the cushion attachments 11 of the present invention may be used to unobtrusively affix the cushion members 28 to the roof rails 36. The tether attachments 10 may also be used to attach the tethers 29 to the A pillars 34. The tether attachments 10 are preferably weak enough to permit detachment of the tethers 29 from the A pillars 34 during deployment of the cushion members 28.

In most vehicles, the A pillars 34, B pillars 33, and roof rails 36 are extensions of the vehicle frame designed to provide protection in the event of a vehicle rollover. Thus, they may be configured as hollow members constructed of a sturdy material such as steel.

Figure 2:
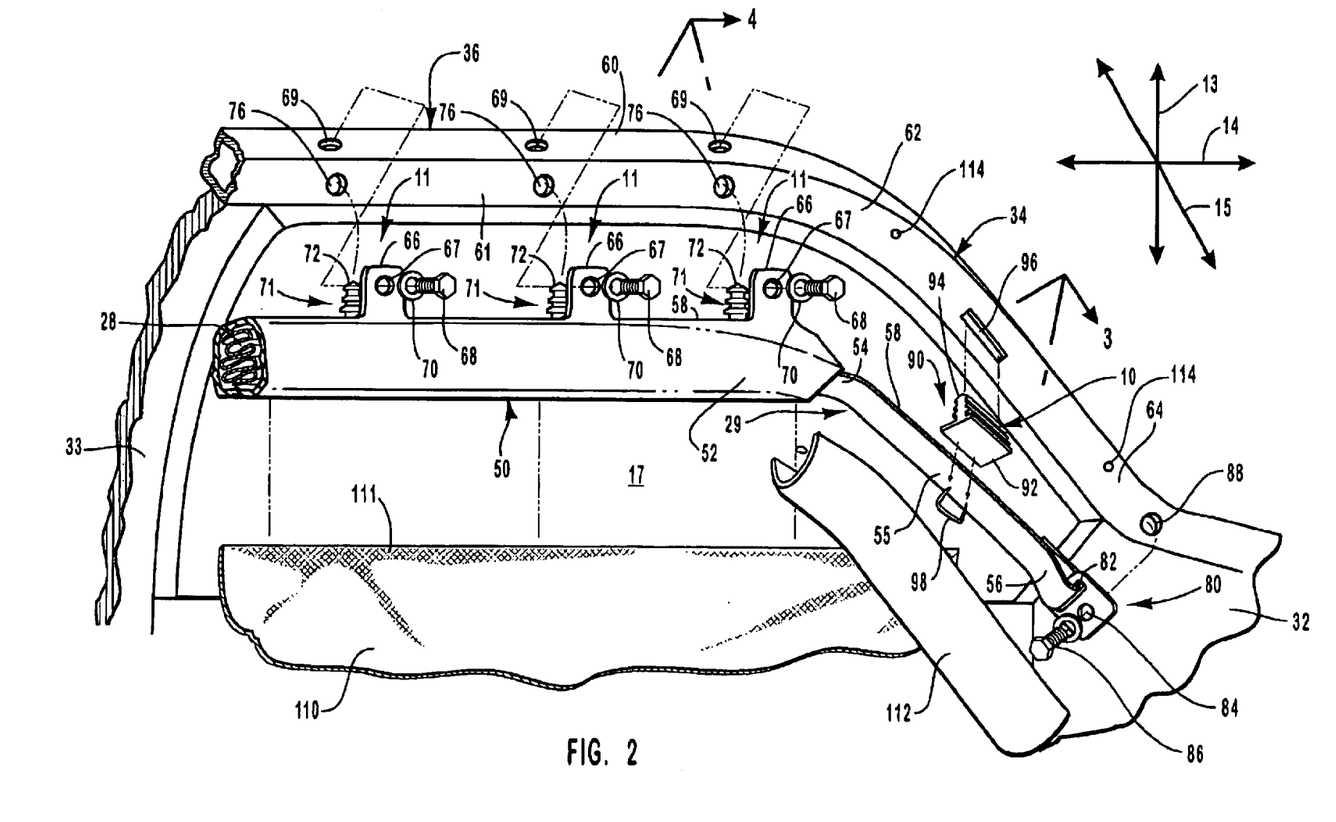
FIG. 2 is a perspective view of an interior, driver's-side portion of a vehicle with a curtain module and a tether positioned for attachment on a roof rail and an A pillar of the vehicle through the use of attachment assemblies according to the invention.

Referring to FIG. 2, a perspective view of an interior portion of the vehicle 12 is depicted, from a viewpoint located over the rear seats 18, looking toward the front door 17 on the driver's side. The windshield 35 and the portion of the roof between the roof rails 36 have been removed for clarity. As shown in FIG. 2, the cushion attachment 11 and the tether attachment 10 are positioned for attachment to the roof rail 36 and the A pillar 34, respectively. However, the attachment assemblies 10, 11 of the present invention may be attached at a wide variety of different vehicle surfaces, such as the B pillar 33, the front door 17, the front seat 16, or the dashboard 32. Additionally, FIG. 2 depicts only selected embodiments of the attachment assemblies 10, 11; examples of alternative configurations will be shown and described in connection with subsequent figures.

The uninflated cushion members 28 may be folded, rolled, or otherwise compacted to form a curtain module 50 that fits unobtrusively against the roof rail 36. The curtain module 50 may have a first tethered end 52 within which the cushion member 28 is attached to the tether 29. An inward side 53 of the curtain module 50 faces generally inward toward the driver of the vehicle 12. The tether 29 may have a first end 54 attached to the cushion member 28, an intermediate portion 55, and a second end 56 anchored to the A pillar 34. The intermediate portion 55 of the tether 29 includes the greater part of the tether 29. The tether 29 may also have an inward side 58 facing into the vehicle 12.

The curtain attachments 11 of FIG. 2 are adapted for use with a roof rail 36 having a substantially square-shaped cross section. The roof rail 36 may have a first mounting surface 60 facing generally upward, but tilted to face slightly inward. A second mounting surface 61 faces generally inward, and slightly downward. Similarly, the tether attachment 10 of FIG. 2 are well-suited for use with an A pillar 34 having a flat, generally inward and slightly rearward-facing mounting surface 62. The second end 56 of the tether 29 may be anchored at an anchoring point 64 on the mounting surface 62 of the A pillar 34.

The cushion member 50 may be attached both to the first mounting surface 60 and to the second mounting surface 61. The first mounting surface 60 is generally more accessible to installation personnel, yet attachment to the second mounting surface 61 may also be desirable to keep the curtain module 50 from flapping back and forth in the lateral direction 14 during operation of the vehicle 12. Thus, rigid mechanical fasteners may provide the connection to the more accessible first mounting surface 60, while the toolless cushion attachments 11 may be applied to attach the curtain module 50 to the second mounting surface 61.

In order to facilitate attachment to the first mounting surface 60, the curtain module 50 may have a plurality of flexible tabs 66 formed in the fabric of the curtain module 50, each of which has a hole 67. Rigid mechanical fasteners 68 may be threaded through the holes 67 and into openings 69 in the first mounting surface 60. A "rigid mechanical fastener" is a part used to attach two other parts, in which little or no deformation of the fastener is needed to achieve fastening.

The rigid mechanical fasteners 68 may, for example, take the form of bolts 68. The openings 69 may be threaded so that the bolts 68 can be twisted into engagement with the first mounting surface 60 directly. In the alternative, nuts (not shown) may be positioned within the hollow interior cavity of the roof rail 36 and positioned behind the openings 69 to receive the bolts 68 in threaded engagement. Each of the bolts 68 may also be threaded through a washer 70 prior to insertion through one of the flexible tabs 66 and into one of the openings 69. The washers 70 may help to prevent damage to the flexible material of the flexible tabs 66 when the bolts 68 are tightened.

The cushion attachments 11 may then be used to affix the main body of the curtain module 50 to the second mounting surface 61. Each of the cushion attachments 11 may have a clip 71 anchored within the curtain module 50 so that the curtain module 50 can be attached to the second mounting surface 61 through the application of direct, linear force directed toward the second mounting surface 61.

Each clip 71 may have a protrusion 72 extending toward the second mounting surface 61 in alignment with one of a series of openings 76 formed in the second mounting surface 61. The protrusions 72 may take the form of tapered studs 72, which will be depicted and described in greater detail in FIG. 4. As depicted in FIG. 2, each of the bolts 68 has a corresponding cushion attachment 11 at the same longitudinal position. However, the bolts 68 and cushion attachments 11 need not be equal in number and need not be positioned adjacent to each other.

The tether 29 may be fastened at the anchoring point 64 of the A pillar 34 through the use of an anchor plate 80. The anchor plate may have a slot 82 through which the second end 56 of the tether 29 extends to loop back into attachment against itself. The anchor plate 82 may also have a hole 84 into which a fastener 86, such as a screw, bolt or rivet, may be threaded. The fastener 86 may be threadably or otherwise engaged in a socket 88 formed at the anchoring point 64 of the A pillar 34.

The tether attachment 10 of the present invention may then be used to affix the intermediate portion 55 of the tether 29 to the A pillar 34. The tether attachment 10 may include a clip 90 designed to be attached to the tether 29 and to the A pillar 34. Preferably, the attachment of the clip 90 to the tether 29 is weak enough that the tether 29 can detach from the clip 90 when the curtain module 50 deploys to release the cushion member 28. This is what is meant by "removably attachable." The clip 90 then remains affixed to the A pillar 34. However, if desired, the clip 90 may be configured to release from the A pillar 34, while remaining affixed to the tether 29. The clip 90 may have any number of configurations utilizing adhesives, rigid mechanical fasteners, flexible fastening devices, or the like to provide adherence to the vehicle surface. One such configuration is shown in FIG. 2 and will be described in greater detail below.

As depicted, the clip 90 includes a flange 92 with a generally thin, rectangular shape. The flange 92 may be formed unitarily with a protrusion 94 configured to engage an opening 96 in the A pillar 34. The protrusion 94 preferably takes the form of a tapered stud 94 configured to compress to fit within the opening 96, but to resist withdrawal from the opening 96. The tapered stud 94 will be shown and described in greater detail in connection with FIG. 3.

The clip 90 may be affixed to the intermediate portion 55 of the tether 29 through the use of a removable attachment 98. The removable attachment 98 has a comparatively low fastening strength so that the tether 29 can pull free of the clip 90 when the cushion member 28 deploys. Preferably, the removable attachment 98 operates in such a way that all parts of the tether attachment 10 remain in some way attached to the vehicle 12 so that they are not ejected into the vehicle 12 to injure passengers. The removable attachment 98 may, for example, take the form of a staple 98, as depicted in FIG. 2. Preferably, the staple 98 has a comparatively narrow profile so that the staple 98 can simply tear through the fabric of the tether 29. The staple 98 thus remains affixed to the clip 90 while the tether 29 deploys. Multiple staples 98 may be used as long as the fastening strength of the staples 98 remains appropriately small.

The curtain module 50 and the tether 29 are preferably hidden from view. Thus, after the curtain module 50 has been installed, a headliner 110 may be installed in the vehicle 12. The headliner 50 may simply take the form of a thin fabric shaped to cover the interior of the roof of the vehicle 12. A lateral edge 111 of the headliner 110 may be affixed at or near the roof rail 36 underneath the curtain module 50. In the alternative, trim (not shown) may be attached over the curtain module, and the lateral edge 111 of the headliner 110 may be affixed above the trim. Trim 112 maybe affixed to the A pillar, for example, through the use of holes 114 in the A pillar to conceal the tether 29. The trim 112 may take the form of a long, somewhat flexible piece of polymeric material with a roughly C-shaped cross section.

Figure 3:
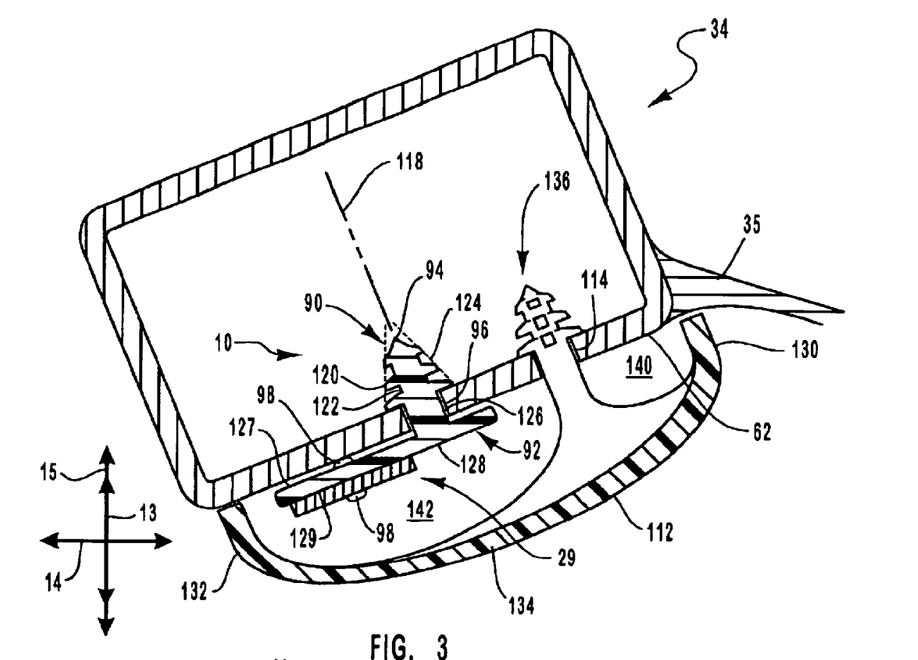
FIG. 3 is a sectioned view of the A pillar of FIG. 2, with an attached tether, clip, and trim.

Referring to FIG. 3, a cross-sectional view of the A pillar 34 is depicted, taken through the fully assembled tether assembly 10 with the trim 112 attached. The tapered stud 94 may have a lengthwise direction 118 along which the tapered stud 94 can be moved into engagement with the opening 96. The tapered stud 94 may have a plurality of flexible branches 120 extending outward from the lengthwise direction 118, separated by recesses 122. The tapered stud 94 may have an overall tapered profile 124 so that the tapered stud 94 is wider toward the flange 92 and narrower away from the flange 92. The tapered profile 124 may determine the contouring of each of the branches 120 as well as the relative sizes of the branches 120.

The tapered profile 124 makes insertion of the tapered stud 94 into the opening 96 easier because, as the tapered stud 94, in the uncompressed configuration, contacts the walls of the opening 96, radial pressure is exerted inward to compress the tapered stud 94 into a compressed configuration so that the tapered stud 94 can be pushed further into the opening 96. A "compressed configuration" relates to a state in which the overall profile of the tapered stud 94 is narrower than in the undeflected state, or the "uncompressed configuration." The plurality of branches 120 may be advantageous over a single tapered structure, such as a triangular prism or a cone, because the branches 120 are thin enough to bend.

Bending of a member caused by a force perpendicular to the member is generally proportional to the magnitude of the force, the elastic modulus of the material of the member, the thickness of the member, and the way in which the material of the member is distributed with respect to the central, or neutral, axis of the material. High deflection is desirable for the tapered stud 94 because a higher degree of elastic compression in the tapered stud 94 permits a larger tapered stud 94 to be used. A larger tapered stud 94 produces a greater interference with the opening 96 so that a higher degree of force is required to pull the fully installed tapered stud 94 from the opening 96.

Thus, the tapered stud 94 is preferably constructed of a material with a comparatively low elastic modulus, such as a plastic. Similarly, the thin geometry of the branches 120 permits a far greater degree of bending than would be possible with thicker structures, such as a simple triangular prism or cone. The stress produced by bending is also generally proportional to the thickness of the member, so even though the branches 120 are subject to comparatively large deflection, the stress in the branches 120 is not sufficient to break the branches 120. If desired, the branches 120 may be made such that some plastic deformation occurs during insertion of the tapered stud 94 into the opening 96.

Preferably, the fastening strength of the tapered stud 94 is great enough to keep the tapered stud 94 in place during operation of the vehicle 12 and deployment of the cushion member 28. However, the fastening strength is preferably not so great that the clip 90 cannot be removed deliberately for replacement or servicing.

The tapered stud 94 need not be as depicted in FIG. 3. For example, the tapered stud 94 may have an overall bent or angling shape. Alternatively, the tapered stud 94 may have trenches or ridges (not shown) running along the branches 120 and recesses 122 in the lengthwise direction 118 to permit further deformation of the branches 120 as they are inserted into the opening 96. The branches 120 are, indeed, optional, but may be beneficially included for the reasons outlined above.

After the tapered stud 94 has passed fully through the opening 96, a shank 126 of the clip 90 is positioned within the opening 96. The shank 126 is preferably sized to fit within the opening 96 with a small amount of clearance so that the shank 126 cannot rattle within the opening 96 during operation of the vehicle 12. The tapered stud 94 is then fully within the opening, and the larger part of the tapered profile 124 is unable to reenter the opening 96 absent the application of a considerably greater force than that used to insert the tapered stud 94 into the opening 96.

As viewed along the lengthwise direction 118, the tapered stud 94 of FIG. 3 has a substantially rectangular cross-sectional shape. "Substantially rectangular" refers to a shape with a generally rectangular profile; a precise rectangle is not required. Thus, each of the branches 120 and recesses 122 may have generally straight outer edges, as viewed along the lengthwise direction 118. The opening 96 similarly has a rectangular shape. Although a round cross-sectional shape may be used, the rectangular shape permits the use of an elongated opening 96 with a greater cross-sectional area than would be available with a round cross-section, given the limited width of the A pillar. The larger cross-sectional area permits the insertion of larger branches 120, thereby giving the rectangular version a somewhat higher fastening strength.

In the case of the tether attachment 10, the high fastening strength ensures that the clip 90 cannot be withdrawn from the opening 96 and flung into the vehicle 12 when the tether 29 deploys. The rounded cross-sectional shape may still be used for attachment assemblies that do not require such a high fastening strength.

As configured in FIG. 3, the flange 92 has a simple rectangular shape with a straight cross-section. The flange 92 may have a first side 127, upon which the shank 126 is formed, and a second side 128 facing opposite the first side 127. A mounting surface 129, upon which the tether 29 is mounted, may be disposed generally on the second side 128, and may have a substantially flat shape to accommodate the tether 29. "Substantially flat" includes surfaces with a slight curvature, as long as the tether 29 is able to lie against the mounting surface 129 without protruding significantly from the vehicle surface, or the A pillar 34.

In the embodiment of FIG. 3, the mounting surface 129 lies substantially perpendicular to the lengthwise direction 118 so that pressure against the tether 29 will be transmitted through the mounting surface 129 to move the clip 90 in the lengthwise direction 118. "Substantially perpendicular" refers to an angle at which pressure normal to the mounting surface 129 is sufficiently aligned with the lengthwise direction 118 to press the tapered stud 94 into the opening 96. Configurations to be described subsequently may have a mounting surface positioned "substantially parallel" to the lengthwise direction 118 so that pressure parallel to the mounting surface will attach the clip to the vehicle surface.

The trim 112 may have a first extension 130 and a second extension 132, each of which extends to contact the mounting surface 62 of the A pillar 34 and encapsulate the tether 29. More specifically, the first extension 130 may be located forward of the tether 29, toward the windshield 35, and the second extension may be located rearward of the tether 29, toward the front door 17. A middle portion 134 of the trim 112 may bulge outward somewhat from the mounting surface 62 of the A pillar 34. A tapered stud 136, similar to the tapered stud 94 of the tether attachment 10, may extend generally from the intermediate portion 134 of the trim 112 to engage the holes 114 to hold the trim 112 in place. The trim 112 may thus be affixed to the A pillar 34 in substantially the same way as the tether attachment 10.

The rounded cross-sectional shape of the trim 112 produces an inner compartment 140 between the tapered stud 136 and the first extension 130 and an outer compartment 142 between the tapered stud 136 and the second extension 132. The tether 29 must be positioned within the outer compartment 142 so that the tether 29 is not trapped behind the tapered stud 136 when the cushion member 28 deploys. The tether attachment 10 ensures that no part of the tether 29 is positioned within the inner compartment 140, behind one of the tapered studs 136 of the trim 112.

Although FIGS. 1 and 2 depict the use of a single tether attachment 10 for each tether 29, multiple tether attachments 10 may be used to effectively route each tether 29. Longer tethers 29 may require the use of additional tether attachments 10. Additionally, tethers need not be anchored to the A pillar 34, but may be attached to other vehicle surfaces, such as the B pillar 33, the dashboard 32, or the roof rail 36. The tether attachments 10 may be readily adapted for use with nearly any tether mounting.

The tether attachment 10 may be assembled by, first, aligning the tether 29 with the mounting surface 129 of the clip 90. Then, the staple 98 may be applied by driving the prongs of the staple 98 through the fabric of the tether 29 and through the mounting surface 129, to exit through the first side 127 of the flange 92. The prongs may then be bent inward to keep the staple in place. The anchor plate 80 may then be attached by inserting the second end 56 of the tether 29 into the slot 82 and stitching the second end 56 against itself. The tether 29 with the affixed tether attachment 10 and anchor plate 80 may then be sent to the automaker for attachment to the vehicle 12.

The tether 29 may be attached to the vehicle 12 by, first aligning the hole 84 of the anchor plate 80 anchor plate 80 with the socket 88 of the A pillar 34. The fastener 86 may then be threaded through the hole 84 and engaged within the socket 88 to pivotally attach the anchor plate 80 to the A pillar 34. Then, the tether attachment 10 may be attached to the A pillar 34 by aligning the tapered stud 94 with the opening 96 pressing against the intermediate portion 55 of the tether 29 until the tapered stud 94 is engaged within the opening 96.

Figure 4:
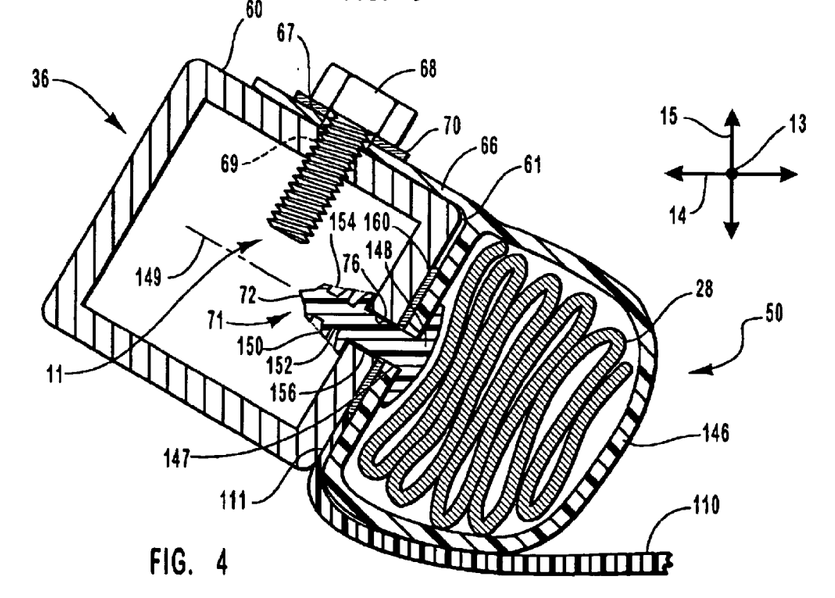
FIG. 4 is a sectioned view of the roof rail of FIG. 2, with an attached clip, curtain module, rigid mechanical fastener, and washers.

Referring to FIG. 4, a sectioned view of the roof rail 36 is shown, with the curtain module 50 attached through the use of the curtain attachments 11. One of the curtain attachments 11 is depicted in the section view. The curtain module 50 may have an envelope 146 constructed of a flexible material such as a fabric or some other structure configured to contain the cushion member 28 in its deflated state. A hole 147 may be formed in the envelope 146, through which the clip 71 extends. The clip 71 may have a head 148 sized somewhat larger than the hole 147 so that the clip 71 cannot be pulled out of the hole 147.

Like the tapered stud 94 of the tether attachment 10, the tapered stud 72 of the cushion attachment 11 may have a lengthwise direction 149 in which the tapered stud 72 can be moved to engage the clip 72 within the opening 76 of the roof rail 36. The tapered stud 72 may a have a plurality of alternating branches 150 and recesses 152 so that the tapered stud 72 can be engaged within the opening 76 in much the same fashion as the tapered stud 94. As with the tapered stud 94, the tapered profile 154 of the tapered stud 72 induces radial compression against the branches 150 when the tapered stud 72 is inserted into the opening 76. The branches 150 bend to pass through the opening 76, and return to their undeflected state to prevent removal of the tapered stud 72 from the opening 76 without the application of a greater level of force.

The fastening strength, or force required to remove the tapered stud 72 from the opening 76, is preferably large enough that the curtain module 50 remains firmly attached during operation of the vehicle 12 and deployment of the cushion member 28. However, the fastening strength is preferably not so great that a person applying specific pressure, such as a prying motion between the curtain module 50 and the roof rail 34, is unable to remove the curtain module 50 for servicing or replacement.

In the embodiment of FIG. 4, the clip 71 is utilized in an auxiliary role because the bolts 68 provide relatively secure attachment. Thus, the tapered stud 72 need not have a very high fastening strength to keep the curtain module 50 attached. The tapered studs 72 may thus have a substantially circular cross-sectional shape perpendicular to the lengthwise direction 149 and the openings 76 may similarly be circular. "Substantially circular" refers to a shape with a generally circular profile, although the shape need not be a perfect circle. In configurations in which the clip 71 forms the primary attachment or the only attachment, it may be desirable to use a tapered stud with a rectangular cross-section, like the tapered stud 94 of the tether attachment 10 described above.

The tapered stud 72 may be affixed to the head 148 by a shank 156 sized to fit somewhat snugly within the opening 76. Prior to insertion of the tapered stud 72 into the opening 76, A washer 160 may be positioned on the shank 156 outside the hole 147. The washer 160 may be configured to grip the shank 156 so that the shank 156 cannot retreat further into the hole 147. The washer 160 may, for example, have a toothed hole (not shown) through which the shank 156 extends. The teeth extend inward to contact the shank 156 and deflect slightly to apply gripping pressure. Thus, through the use of the washer 160, the tapered stud 72 is always extended outward from the hole 147 and properly positioned for insertion into the opening 76.

Assembly of the curtain attachment 10 maybe carried out by, first, inserting the clip 71 into the hole 147 of the envelope 146 from within the envelope 146. The clip 71 is preferably inserted into the hole 147 before the cushion member 28 has been positioned within the envelope 146, so that the hole 147 is unimpeded by the cushion member 28. When the clip 71 is in place, the cushion member 28 may be positioned over the head 148 of the clip, and the envelope 146 may be fastened to secure the cushion member 28. Preferably, the envelope 146 has a weakened section through which the cushion member 28 can deploy.

The washer 160 may then be affixed to the shank 156 to keep the clip 71 in place. The curtain module with the clips 71 may then be shipped to the automaker. The automaker may then install the curtain module by positioning the flexible tabs 66 over the first mounting surface 60, engaging the bolts 68 within the openings 69, and then pressing in the lateral direction 14 against the envelope 146 to engage the tapered studs 72 within the openings 76.

The bolts 68 can be relatively easily attached using a tool, such as a power-driven wrench, to twist the bolts 68 into place, because the first mounting surface 60 faces upward and is easily reached from outside the vehicle 12. The second mounting surface 61 is less accessible, but attachment of the curtain attachments 11 is still easily carried out because an installer need only apply pressure by hand to press the curtain module 50 against the second mounting surface 61.

After the curtain module 50 has been attached to the roof rail 36, the headliner 110 may be attached within the vehicle 12. The lateral edge 111 of the headliner 110 may be sandwiched between the curtain module 50 and the roof rail 36, or may be otherwise attached to hide the curtain module 50 through methods known in the art.

The attachment assemblies 10, 11 of the present invention may readily be adapted for use on a wide variety of vehicles. Vehicles have greatly varied structural designs; thus, the roof rails, A pillars, and B pillars of the vehicles may not have a rectangular cross section, and may not have the same orientation as the A pillar 34 and the roof rail 36 depicted in FIGS. 1 through 4. Additionally, each vehicle may have a different assembly process, so that different modes of airbag attachment are desirable. FIGS. 5 through 8 provide examples of how the attachment assemblies 10, 11 can be adapted for use with various vehicle surfaces. Those of skill in the art will recognize that numerous additional modifications exist within the scope of the invention.

Figure 5:
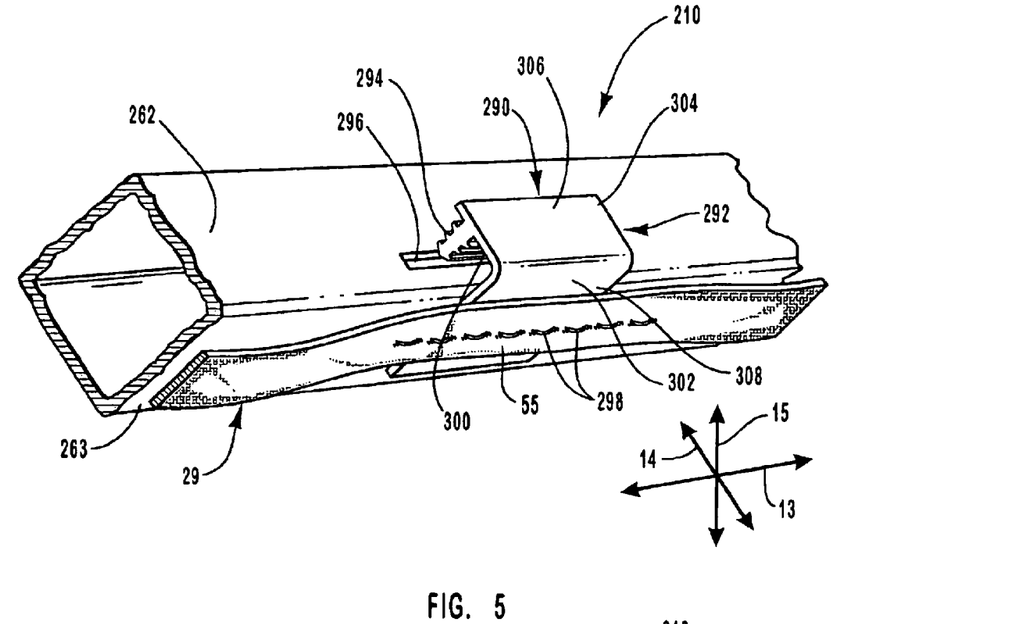
FIG. 5 is a perspective view of an alternative embodiment of a tether attachment, incorporating an L-shaped clip according to the present invention.

Referring to FIG. 5, an alternative embodiment of a tether attachment 210 is depicted. The tether attachment 210 is well-adapted for use with an A pillar 234 with a generally rectangular, or even square-shaped cross-section, like that of the A pillar 34 of FIG. 3. However, due to the orientation of the A pillar 234 or the constraints of the assembly process, it may be desirable to make the tether 29 attachable through pressure applied sideways against the tether. Thus, the A pillar 234 may have a mounting surface 262 disposed at an angle, such as a 90°, from the tether mounting surface 263, against which the tether 29 lies.

A somewhat differently-configured clip 290 may be used to provide the desired attachment angle. The clip 290 may have a flange 292 affixed to a protrusion 294 such as a tapered stud 294. The tapered stud 294 may have rectangular cross-section similar to the tapered stud 94 shown in FIG. 3, so that the tapered stud 294 will have a relatively high fastening strength. An opening 296 with a corresponding rectangular shape may be provided in the mounting surface 262 to receive the tapered stud 294.

The tether 29 may be affixed to the clip 290 through the use of a removable attachment 298 comprising a thread woven through the intermediate portion 55 of the tether 29 and the flange 292. Special stitching equipment, such as a larger needle, may be utilized to form the appropriate holes in the flange 292. Like the staple 98, the thread 298 is preferably thin enough that the tether 29 can rip through the thread 298, or so that the thread 298 can break when the tether 29 deploys. If desired, multiple passes may be made with the thread 298, so long as the fastening strength of the thread 298 remains small enough to permit detachment of the tether 29.

The flange 292 may have a first side 300 generally facing the A pillar 234 and a second side 302 generally facing away from the A pillar 234. The tapered stud 294 may be affixed to the first side 300, perpendicular to an angled extension 304 of the flange 292. The flange 292 may have a bend 306 at one edge of the angled extension 304, from which a mounting surface 308 extends substantially perpendicular to the angled extension 304. The tether 29 is thus laid against the mounting surface 308 and attached with the thread 298 so that the tether 29 will lie against the tether routing surface 263 of the A pillar 234.

The configuration of FIG. 5 may be advantageous because an installer need not reach around the A pillar 234 to press the tether 29 against the tether routing surface 263. Rather, pressure may be applied from against the mounting surface 262, which may be more easily accessible due to its orientation toward the forward side of the A pillar 234. Otherwise, installation of the tether attachment 210 may be substantially as described in connection with the tether attachment 10 of FIG. 3.

Figure 6:
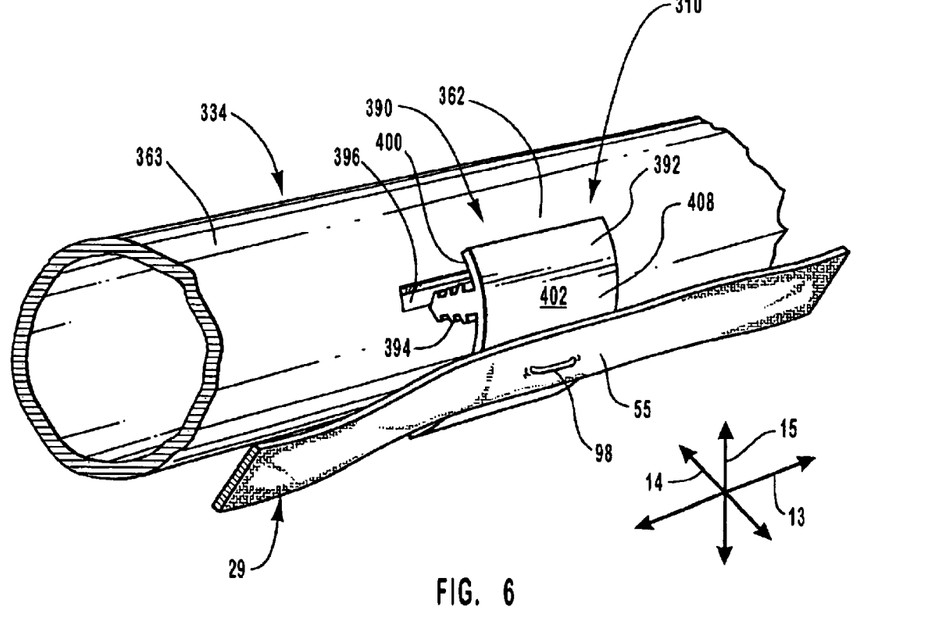
FIG. 6 is a perspective view of another alternative embodiment of a tether attachment, incorporating a curved clip according to the present invention.

Referring to FIG. 6, another alternative embodiment of a tether attachment 310 is depicted. The tether attachment 310 may be utilized to attach the tether 29 to an A pillar 334 with a circular or otherwise rounded cross-sectional shape. The A pillar 334 may have a roughly forward-facing mounting surface 362 and a tether routing surface 363 facing into the vehicle. A clip 390 may be provided to adhere to the rounded shape of the A pillar 334 and to properly displace the tether 29 from the mounting surface 363.

The clip 390 may have a flange 392 with a generally curved shape that conforms to the profile of the A pillar 334. The clip 390 may also have a protrusion 394 in the form of a tapered stud 394 with a generally rectangular cross section similar to the tapered studs 94, 294 depicted in FIGS. 3 and 5. The tapered stud 394 is positioned for entry into an opening 396 in the A pillar 334 with a similarly rectangular shape.

The flange 392 may have a first side 400 facing toward the A pillar 334, on which the tapered stud 394 is affixed or unitarily formed, and a second side 402 facing away from the A pillar 334. The second side 402 may have a mounting surface 408, which may comprise a flattened portion of the second side 402, or may be slightly curved in the overall shape of the flange 392. The tether 29 is affixed to the mounting surface by a removable attachment, such as the staple 98, and positioned over the tether routing surface 363 when the clip 390 is attached to the A pillar 334. As with the tether attachment 210 of FIG. 5, the tether attachment 310 may advantageously be attached by pressing the clip 390 against the mounting surface 362, without reaching around the A pillar 334.

Figure 7:
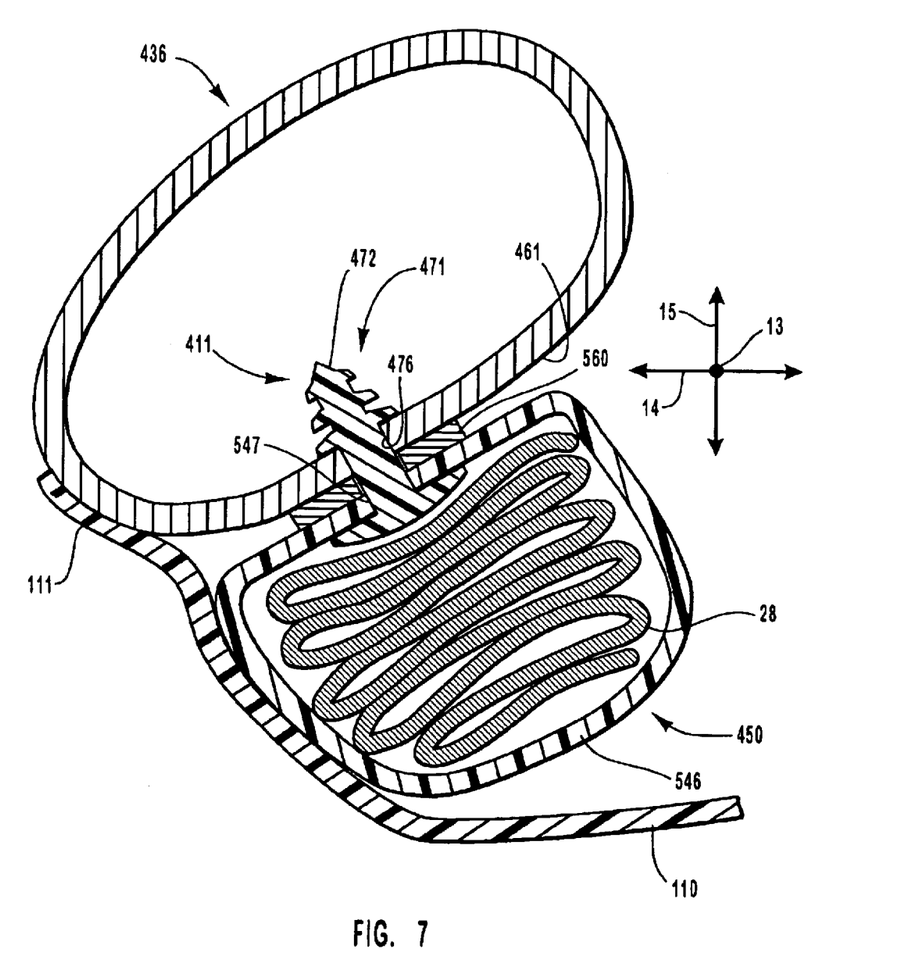
FIG. 7 is a sectioned view of an alternative embodiment of a curtain attachment, incorporating a clip without rigid mechanical fasteners according to the present invention.

Referring to FIG. 7, a cross-sectional view of an alternative embodiment of a cushion attachment 411 is depicted. The cushion attachment 411 may be used in conjunction with a wide variety of roof rails including the roof rail 436, which has a generally oval cross-sectional shape. Unlike the cushion attachment 11, the cushion attachment 411 functions without any rigid mechanical fasteners, such as screws, bolts, or the like. The cushion attachment 411 may be used to attach a curtain module 450, similar to the curtain module 50 without the flexible tabs 66, to a mounting surface 461 inwardly located on the roof rail 436.

The curtain module 450 may be affixed through the use of a plurality of clips 471, one of which is depicted in cross section in FIG. 7. The clip 471 may have a profile similar to the clip 71. However, the clip 71 may have a rectangular cross-sectional shape, like the clip 90, instead of the circular cross-sectional shape of the clip 71. As described previously, the rectangular cross-sectional shape generally provides a higher fastening strength. The higher fastening strength may be necessary because the clips 471 must, alone, support the weight of the curtain module 450.

Like the clip 90, the clip 471 may have a tapered stud 472 shaped to be engaged within a substantially rectangular opening 476 in the roof rail 436. The clip 471 may be anchored in an envelope 546 containing the cushion member 28. More specifically, the clip 471 may protrude through a hole 547 in the envelope 546 so that the tapered stud 472 is exposed. A washer 560 may be used to hold the clip 471 in position within the envelope 546 in a fashion similar to that of the washer 160. However, the washer 560 may have an opening (not shown) with inward-protruding teeth arrayed in a generally rectangular shape to frictionally engage the rectangular cross-section of the clip 471. As with the configuration of FIG. 4, the lateral edge 111 of the headliner 110 may be affixed to the roof rail 436.

Figure 8:
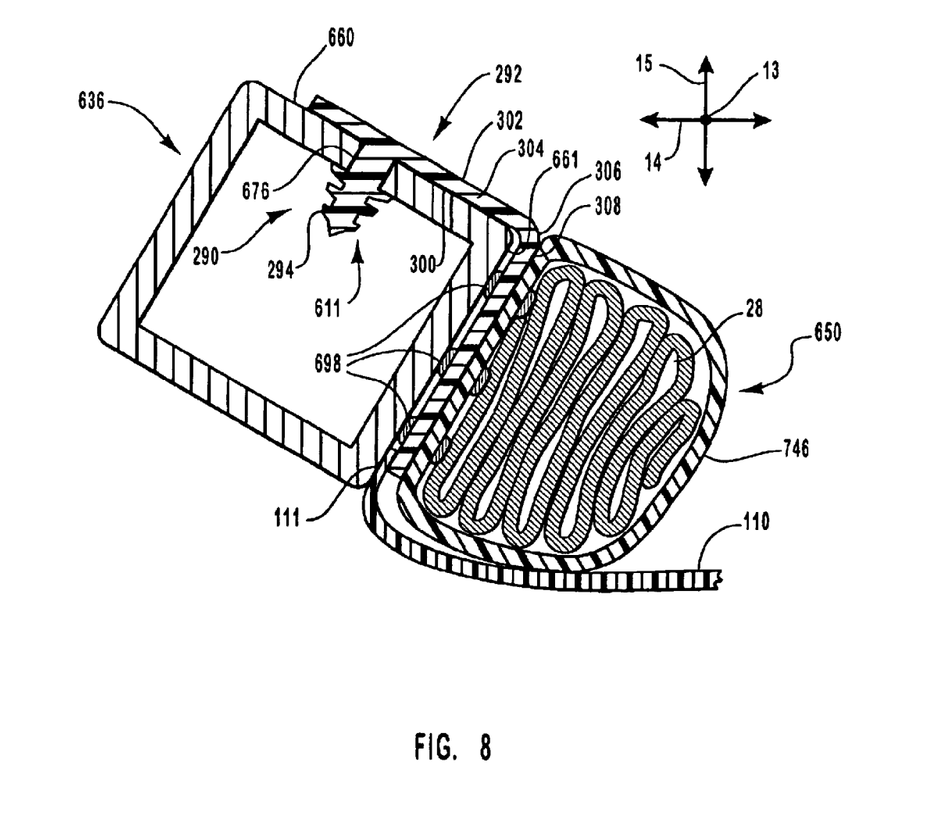
FIG. 8 is a sectioned view of another alternative embodiment of a curtain attachment, incorporating an L-shaped clip according to the present invention.

Referring to FIG. 8, a cross-sectional view of another alternative configuration of a cushion attachment 611 is depicted. The cushion attachment 611 utilizes the L-shaped clip 290 of FIG. 5 to affix a curtain module 650 to a roof rail 636 with a generally rectangular cross-sectional shape similar to that of the A pillar 234 of FIG. 5. More specifically, the roof rail 636 has a first mounting surface 660 against which force is to be applied to attach the clip 290 and a second mounting surface 661 directly facing the cushion module 650.

The clip 290 once again has a flange 292 and a tapered stud 294 configured to be engaged within an opening 676 of the roof rail 636. The flange 292 may have first side 300 facing generally inward and a second side 302 facing outward. The tapered stud 294 is affixed to an angled extension 304. A bend 306 in the flange 292 provides a mounting surface 308 rotated roughly 90° from the angled extension 304. Thus, the angled extension 304 is positioned over the first mounting surface 660 of the roof rail 636 and the mounting surface 308 of the clip 290 is positioned over the second mounting surface 661 of the roof rail 636. The lateral edge 11 of the headliner 110 may once again be attached to the roof rail 636, above or below the curtain module 650, depending on whether trim is used to hide the curtain module 650.

The curtain module 650 may be affixed to the mounting surface 308 of the clip 290 through the use of a plurality of attachments 698, which may take the form of staples 698 driven through an envelope 746 of the curtain module 650. Several staples 698 may beneficially be used to ensure that the curtain module 650 remains firmly fastened to the clip 290 during use of the vehicle 12 and deployment of the cushion member 28. In the alternative, a single, heavy-duty staple, with a thickness and/or length sufficient to ensure that the fabric of the envelope 746 cannot rip through the staple, may be used. In order to attach the staples 698, the mounting surface 308 of the clip 290 may be aligned with the envelope 746 prior to attachment of the cushion member 28 within the envelope 746. The staples 698 may then be driven through the envelope 746 and the clip 290, and the prongs may be bent to keep the staples in place. If desired, the curtain module 650 may also be sewn to the clip 290.

The curtain attachment 611 of FIG. 8 provides a benefit similar to that of the tether attachments 210, 310 depicted in FIG. 5 and FIG. 6. In effect, the installation angle need not be directly against the surface on which the curtain module 650 is to be located. Rather, pressure directed against the comparatively accessible first mounting surface 660 results in attachment of the curtain module 650 over the second mounting surface 661 at a less accessible location.

The methods and apparatus of the present invention enable airbag components, such as cushion modules and tethers, to be easily and rapidly affixed to the appropriate vehicle surface. The cushion and tether attachments presented herein, and more particularly, the contoured flange designs, modify traditional installation angles to ensure that fastening devices, especially those that require tools, are installed along angles that are comfortable and easily accessible for an installer. The branched design of the tapered studs ensures that the attachment force of the attachment assemblies remains small enough for easy installation. Additionally, the tapered studs provide a fastening strength high enough to keep the airbag components in place, but not so high that the attachment assemblies cannot be removed for repair or replacement. Removable attachments used for tether routing ensure that the tether lies properly within the trim for rapid and accurate deployment.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An attachment assembly for attaching a tether for an airbag assembly to a vehicle surface, the attachment assembly comprising:
   a tether comprising a first end affixed to a cushion member of the airbag assembly, a second end anchored at an anchoring point of a vehicle, and an intermediate portion positioned generally between the first end and the second end; and
   a tether attachment configured to attach the intermediate portion to a vehicle surface, the tether attachment having a fastening strength selected to permit detachment of the intermediate portion from the vehicle surface during deployment of the cushion member.

2. The attachment assembly of claim 1, wherein the tether attachment comprises a clip removably attachable to the intermediate portion of the tether, the clip being configured to remain affixed to the vehicle surface during deployment of the airbag assembly.

3. The attachment assembly of claim 2, wherein the clip comprises a protrusion having a compressed configuration and an uncompressed configuration, the protrusion being sized to fit through an opening in the vehicle surface in the compressed configuration, but not in the uncompressed configuration, the protrusion having a lengthwise direction in which the protrusion can be moved for installation in the opening.

4. The attachment assembly of claim 3, wherein the protrusion comprises a tapered stud with flexible branches, the branches being compressible to permit entry of the tapered stud into the opening.

5. The attachment assembly of claim 3, wherein the clip comprises a mounting surface shaped to fit the intermediate portion of the tether.

6. The attachment assembly of claim 5, wherein the mounting surface is substantially flat and is oriented substantially perpendicular to the lengthwise direction.

7. The attachment assembly of claim 5, wherein the mounting surface is substantially flat and is oriented substantially parallel to the lengthwise direction, the mounting surface being offset from the protrusion by an angled extension extending between the protrusion and the mounting surface.

8. The attachment assembly of claim 5, wherein at least a portion of the mounting surface is curved.

9. The attachment assembly of claim 3, wherein the protrusion comprises a substantially circular cross-sectional shape perpendicular to the lengthwise direction.

10. The attachment assembly of claim 3, wherein the protrusion comprises a substantially rectangular cross-sectional shape perpendicular to the lengthwise direction.

11. The attachment assembly of claim 1, wherein the tether attachment comprises a staple piercing the intermediate portion of the tether, the staple being sized to tear through the tether to release the tether during deployment of the airbag assembly.

12. The attachment assembly of claim 1, wherein the tether attachment comprises a thread piercing the intermediate portion of the tether, the thread being configured to tear through the tether to release the tether during deployment of the airbag assembly.

13. An attachment assembly for attaching a curtain module to a roof rail having an opening formed therein, the attachment assembly comprising:

a curtain module configured to be affixed to the roof rail;

a clip attached to the curtain module, the clip comprising a protrusion having a compressed configuration and an uncompressed configuration, wherein the protrusion is configured to be insertable, in a lengthwise direction of the protrusion, into the opening when the protrusion is in the compressed configuration, but not when the protrusion is in the uncompressed configuration, wherein the protrusion comprises a tapered stud having a plurality of tapered branches, the plurality of branches being separated by at least one recess, and further comprising a staple piercing the curtain module and the clip to attach the curtain module to the clip.

14. The attachment assembly of claim 13, wherein the curtain module further comprises a flexible tab having a hole configured to receive a rigid mechanical fastener, wherein the rigid mechanical fastener is configured to be attached to the roof rail.

15. The attachment assembly of claim 13, wherein the curtain module is configured to be attached to the roof rail without rigid mechanical fasteners.

16. The attachment assembly of claim 13, wherein the clip further comprises a head positioned within the curtain module, the head being attached to the protrusion by a shank extending outward from the head through a hole in the curtain module, the hole being sized to interfere with passage of the head through the hole.

17. The attachment assembly of claim 16, further comprising a washer disposed on the shank, wherein the washer is configured to grip the shank to keep the protrusion from sliding into the curtain module through the hole prior to installation of the protrusion within the opening of the roof rail.

18. The attachment assembly of claim 13, wherein the clip comprises a substantially flat mounting surface oriented substantially perpendicular the lengthwise direction.

19. The attachment assembly of claim 13, wherein the clip comprises a substantially flat mounting surface oriented substantially parallel to the lengthwise direction, the mounting surface being offset from the protrusion by an angled extension affixed to the protrusion and the mounting surface.

20. The attachment assembly of claim 13, wherein the clip comprises a mounting surface, at least a portion of which is curved.

21. The attachment assembly of claim 13, wherein the protrusion comprises a substantially circular cross-sectional shape perpendicular to the lengthwise direction.

22. The attachment assembly of claim 13, wherein the protrusion comprises a substantially rectangular cross-sectional shape perpendicular to the lengthwise direction.

23. An inflatable curtain assembly, comprising:

a plurality of airbag components, wherein each airbag component is configured to be attached to a vehicle surface comprising one of a roof rail, an A pillar, and a B pillar of a vehicle; and a plurality of clips attached to the airbag components, each clip comprising a protrusion, each protrusion having a compressed configuration and an uncompressed configuration, wherein the protrusion is configured such that it is insertable into an opening in one of the vehicle surfaces when the protrusion is in the compressed configuration but is not insertable when the protrusion is in the uncompressed configuration, wherein the protrusion comprises a tapered stud having a plurality of tapered branches, the plurality of branches being separated by at least one recess;

wherein the airbag components comprise a curtain module and a tether and wherein the curtain module is attached to a roof rail, and wherein the tether is attached to an A pillar and wherein the curtain module is attached to the roof rail with a fastening strength selected to keep the curtain module attached during deployment of the inflatable curtain assembly, and wherein an intermediate portion of the tether is attached to the A pillar with a fastening strength selected to permit detachment of the tether from the A pillar during deployment of the inflatable curtain assembly.

24. The inflatable curtain assembly of claim 23, wherein each clip comprises a flange having a first side and a second side opposite the first side, the first and second sides each having at least a substantially flat portion, wherein the first side is connected to the protrusion, and wherein the second side comprises a mounting surface configured to receive one of the airbag components.

25. An attachment assembly for attaching a curtain module to a roof rail having an opening formed therein, the attachment assembly comprising:

a curtain module configured to be affixed to the roof rail;

a clip attached to the curtain module, the clip comprising a protrusion having a compressed configuration and an uncompressed configuration, wherein the protrusion is configured to be insertable, in a lengthwise direction of the protrusion, into the opening when the protrusion is in the compressed configuration, but not when the protrusion is in the uncompressed configuration, wherein the protrusion comprises a tapered stud having a plurality of tapered branches, the plurality of branches being separated by at least one recess, and further comprising a thread piercing the curtain module and the clip to attach the curtain module to the clip.

* * * * *